United States Patent
Nowicki et al.

(10) Patent No.: US 12,407,775 B2
(45) Date of Patent: Sep. 2, 2025

(54) METHOD OF REPORTING AN UNSOLICITED CALL TO A NETWORK OPERATOR, AND USER EQUIPMENT, NETWORK ENTITIES AND TELECOMMUNICATIONS NETWORKS FOR PERFORMING THE METHOD

(71) Applicant: Vodafone Group Services Limited, Newbury (GB)

(72) Inventors: Jakub Nowicki, London (GB); Oscar Gallego, London (GB)

(73) Assignee: Vodafone Group Services Limited, Newbury (GB)

( * ) Notice: Subject to any disclaimer, the term of this patent is extended or adjusted under 35 U.S.C. 154(b) by 195 days.

(21) Appl. No.: 18/249,046

(22) PCT Filed: Oct. 15, 2021

(86) PCT No.: PCT/EP2021/078656
§ 371 (c)(1),
(2) Date: Apr. 13, 2023

(87) PCT Pub. No.: WO2022/084192
PCT Pub. Date: Apr. 28, 2022

(65) Prior Publication Data
US 2023/0370545 A1    Nov. 16, 2023

(30) Foreign Application Priority Data
Oct. 19, 2020   (GB) ...................................... 2016562

(51) Int. Cl.
*H04M 3/42* (2006.01)
*H04M 3/436* (2006.01)
*H04W 12/12* (2021.01)

(52) U.S. Cl.
CPC ....... *H04M 3/42042* (2013.01); *H04M 3/436* (2013.01); *H04W 12/12* (2013.01); *H04M 2203/558* (2013.01)

(58) Field of Classification Search
CPC ............. H04M 3/42042; H04M 3/436; H04M 2203/558; H04W 12/12
(Continued)

(56) References Cited

U.S. PATENT DOCUMENTS 10,447,722 B2 *  10/2019  Hillis ................... H04L 63/1433
11,838,444 B1 *  12/2023  Manzanillo ......... H04M 7/1275
(Continued)

OTHER PUBLICATIONS

International Search Report & Written Opinion for application No. PCT/EP2021/078656 mailed on Jan. 24, 2022.
(Continued)

*Primary Examiner* — Binh Kien Tieu
(74) *Attorney, Agent, or Firm* — Workman Nydegger

(57) ABSTRACT

Detecting, reporting and reducing unsolicited calls in a telecommunications network. Reporting an unsolicited call to a network operator of a telecommunications network. Receiving a message at a user equipment, UE, 500 of the telecommunications network. The message comprises: a unique identifier corresponding to a call to the UE 500 that has been initiated, and one or more pre-defined responses. Receiving at the UE 500 a selected a response of the one or more predefined responses indicating that the call is an unsolicited call. Sending a report to the network operator, the report comprising the unique identifier and the selected response.

15 Claims, 6 Drawing Sheets

(58) Field of Classification Search
USPC .................................................. 379/142.06
See application file for complete search history.

(56) References Cited

U.S. PATENT DOCUMENTS

| | | | | |
|---|---|---|---|---|
| 2007/0039040 A1* | 2/2007 | McRae | .................. | H04L 51/04 |
| | | | | 726/4 |
| 2007/0041372 A1* | 2/2007 | Rao | .................... | H04L 65/1101 |
| | | | | 370/356 |
| 2007/0283006 A1* | 12/2007 | Hong | .................. | H04L 65/1079 |
| | | | | 709/224 |
| 2009/0138697 A1* | 5/2009 | Kim | ................... | H04L 65/1059 |
| | | | | 713/150 |
| 2010/0157853 A1* | 6/2010 | Li | ....................... | H04L 65/1079 |
| | | | | 707/E17.014 |
| 2010/0329241 A1* | 12/2010 | Ryou | ................... | H04M 3/436 |
| | | | | 370/352 |
| 2011/0119749 A1* | 5/2011 | Park | .................... | H04L 65/1079 |
| | | | | 726/13 |
| 2011/0294478 A1* | 12/2011 | Trivi | ..................... | H04M 3/436 |
| | | | | 455/415 |
| 2013/0151605 A1 | 6/2013 | Papakipos et al. | | |
| 2014/0105373 A1* | 4/2014 | Sharpe | ................... | H04M 3/38 |
| | | | | 379/142.05 |
| 2015/0156300 A1* | 6/2015 | Park | ...................... | H04M 1/663 |
| | | | | 455/414.1 |
| 2016/0360036 A1 | 12/2016 | Ansari | | |
| 2017/0163803 A1 | 6/2017 | Russell | | |
| 2020/0045168 A1 | 2/2020 | Sinha | | |
| 2020/0160321 A1* | 5/2020 | Arzumanyan | .......... | H04W 4/12 |

OTHER PUBLICATIONS

International Preliminary Report on Patentability received for PCT Patent Application No. PCT/EP2021/078656, mailed on May 4, 2023, 8 pages.

* cited by examiner

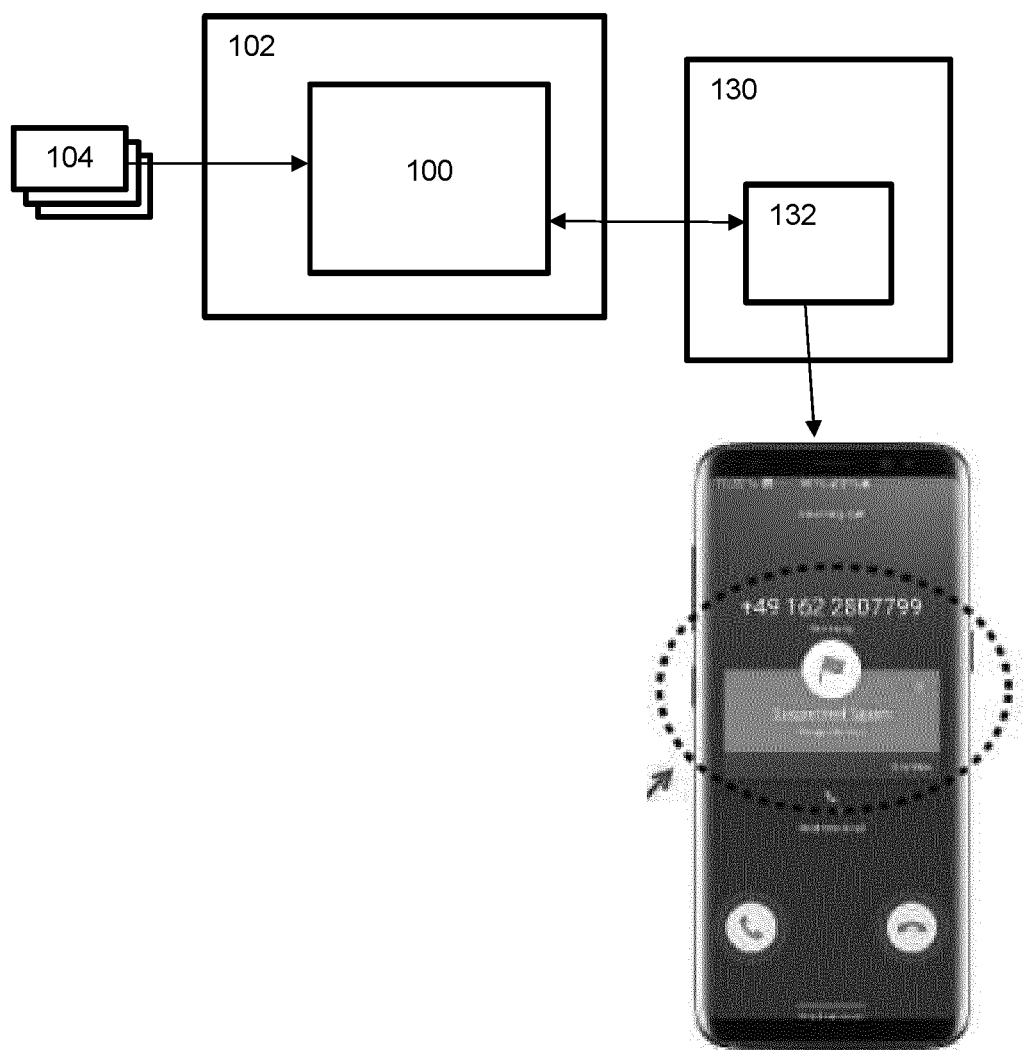
Figure 1 – Prior Art

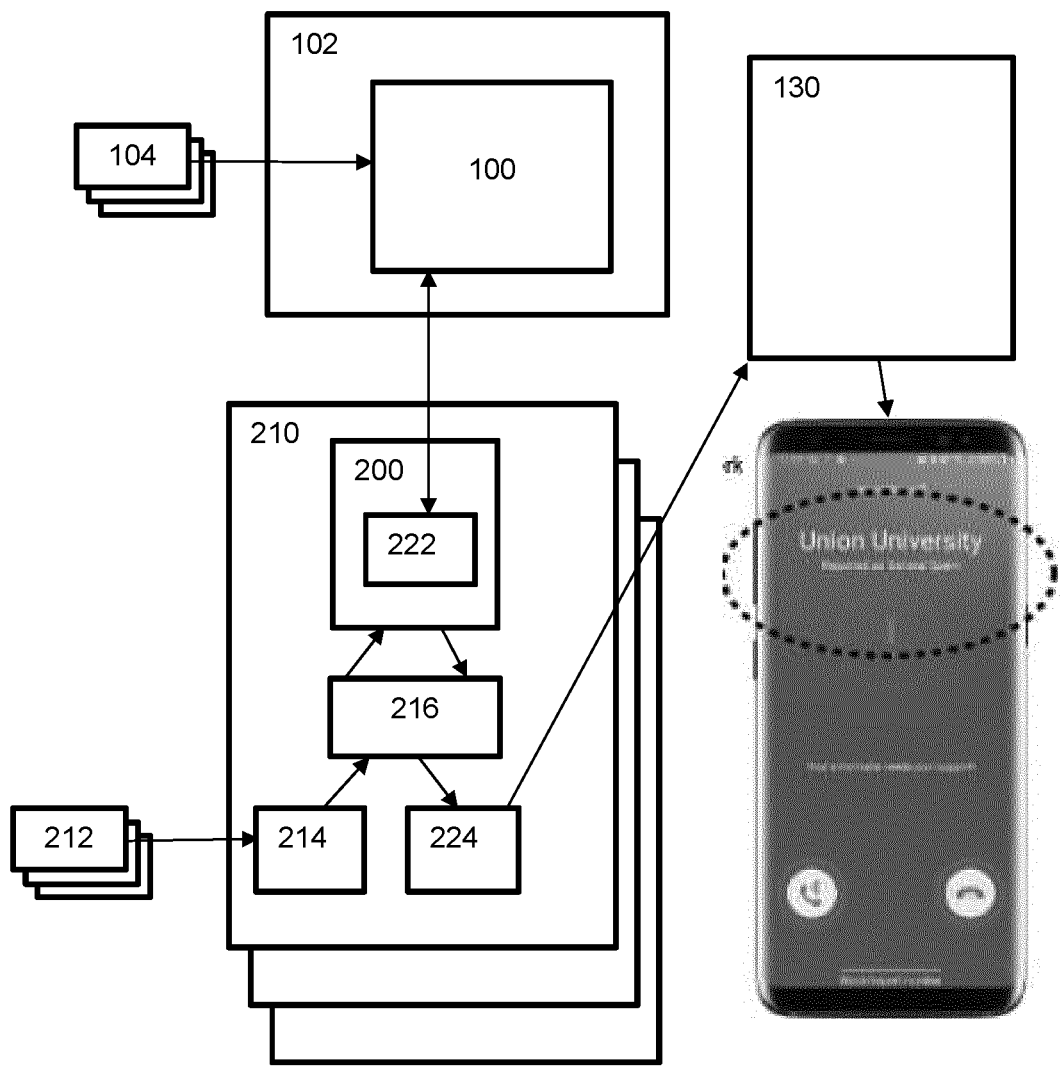
Figure 2 – Prior Art

300

S301: receiving a message at a user equipment, UE, of the telecommunications network, the message comprising: a unique identifier corresponding to a call to the UE that has been initiated, and one or more predefined responses

S302: receiving at the UE a selected a response of the one or more predefined responses indicating that the call is an unsolicited call

S303: sending a report to the network operator, the report comprising the unique identifier and the selected response

Figure 3

METHOD OF REPORTING AN UNSOLICITED CALL TO A NETWORK OPERATOR, AND USER EQUIPMENT, NETWORK ENTITIES AND TELECOMMUNICATIONS NETWORKS FOR PERFORMING THE METHOD

CROSS-REFERENCE TO RELATED APPLICATIONS

The present invention is a 35 U.S.C. § 371 U.S. National Stage of PCT Application No. PCT/EP2021/078656, filed on Oct. 15, 2021, which claims priority to EP 2016562.7, filed on Oct. 19, 2020. The entire content of each of the aforementioned patent applications is incorporated herein by reference.

TECHNICAL FIELD

The present application relates to methods of detecting, reporting and reducing unsolicited calls in a telecommunications network, and to user equipment, network entities and telecommunications networks for implementing the methods.

BACKGROUND

The existence of unsolicited calls is a problem for users of mobile telephones and operators of telecommunications networks. Unsolicited calls may be placed for marketing or promotional purposes. Some users may find these calls harmless or even useful but many find them a nuisance. Such "nuisance calls" may deter a user from answering their phone and this can cause them to miss genuine calls that they wanted to receive. Moreover, the quantity of unsolicited calls placed in a telecommunications network creates a burden on the network infrastructure.

Another example of unsolicited calls is scam phone calls. Scammers may pose as genuine institutions or personal contacts to coerce mobile users into revealing sensitive information or taking action online that can expose the user to fraud or extortion.

To address these problems, some Mobile Network Operators (MNOs) have implemented a reporting service for users to report spam calls. For example some MNOs (such as Vodafone UK®) provide a spam/scam reporting calling line or a web form. Each report is manually checked before being added to a static database containing known spam/scam numbers. That database is consulted during the call setup. The database is relatively small and does not change frequently so it can be exported a few times a day into existing call infrastructure call barring services, without a need for real time integrations. Depending on the call service configuration, calls from known spam/scam numbers can be blocked, or forwarded to the end user but proceeded with a voice message with a warning. However, this may require a considerable level of maintenance and may be unable to respond to fast-changing spam patterns. In practice, it may only be applicable to block serious well-known fraudsters.

Another proposal to address these problems is a software component that is embedded in the native dialler of a specific device manufacturer (e.g., Samsung®). This native dialler component collects information about users that have enabled the service and populates a central database. It then collects information about incoming and outgoing calls and checks caller's current reputation against the central database. The reputation is displayed directly in the dialler user interface. The component also updates caller reputation in real-time, based on factors like calling frequency and call response rate. Additionally, the component also allows users to report spam directly from the native dialler user interface. This information also contributes to future reputation of the caller.

The native dialler component is automated and can react to new spam. Because the native dialler component is device-specific, it also collects spam information from devices that use different Mobile Network Operators. However, the component is limited in scope by the number of users who have the specific device on which it is implemented and also requires the users to accept the Terms & Conditions of the service. Moreover, the system is not integrated with Mobile Network Operators. MNOs wishing to integrate with the system would need to agree a licence with the operator of the native dialler component and share users' data with them. This may require consent from end users, which would need to be collected and managed. As a result, the quantity of data collected by this component may be limited.

Mobile Network Operators can implement a system similar to the native dialler component by providing a downloadable or pre-installed application in users' devices, which collects information about incoming and outgoing calls and checks caller current reputation against the central database. The principle of operation of this caller reputation application is the same but because there is no integration with the native dialler, the calling number reputation needs to be displayed using pop-up notifications or dialog boxes overlaying the dialler. Drawing an overlay on top of other applications requires additional permissions to be granted by user to an application, which some users may object to. The central database may be the same as the database used with the native dialler component. In this case, a licence and revenue share agreement with the operator of the native dialler component may be required (along with an agreement with the user in relation to data sharing). This may limit the quantity of data collected due to some users not agreeing to participate.

It may not be possible to implement the caller reputation application in a straightforward manner on every device. Some operating systems (such as Apple iOS®) do not offer functionality for applications to overlay the dialler with pop-ups or dialog boxes. Ways to partially work around these limitations may exist (e.g. using CallKit iOS® features). However, such workarounds may be difficult to maintain and can result in even more permissions being requested by an application from the user. Users may be unwilling to install applications requiring these permissions. This can limit the quantity of data collected.

FIG. 1 illustrates a Call anti-spam system using a downloadable caller reputation application with a third-party Reputation Application Server.

As can be seen in FIG. 1, a Reputation Application Server 100 is hosted by Amazon Web Services® 102. A UE 130 comprises a Call Protect SDK (Software Development Kit) 132. The UE is configured to display a pop-up when an incoming call is suspected spam using a caller reputation application installed on the UE. Reputation Application Server (RAS) 100 may receive data from the Call Protect SDK 132 and from other RAS users 104.

Another proposal to address these problems is a Call Protect Service using a custom dialler (such as that provided by AT&T®). A custom dialler using similar principles to the native dialler component proposal custom dialler may be downloaded by users as a replacement to the native dialler that comes with their device. The custom dialler may therefore be installed on devices from different manufacturers.

One advantage of a custom dialler over a caller reputation application is that the custom dialler implements the actual user interface of the voice call so there is no need to use overlays displayed by downloadable apps.

One challenge with the custom dialler, is that some users (particularly those in Europe) are reluctant to replace their native phone diallers with custom diallers. As a result, the user base of the Call Protect Service may be limited in some regions and this may limit the quantity and scope of the available data.

Another alternative for Mobile Network Operators is to integrate an external or internal Reputation Application Server with the call backed service. In case of 4G and 5G networks this is provided by a VoLTE server (Voice over Long Term Evolution) called a Telecom Application Server. One benefit of this design is that it can facilitate amending the caller name on calls that are suspected spam. For example, the caller ID could be prepended or replaced with "suspected spam", which would therefore display directly in any dialler, regardless of the Operating System. This system has benefits because additional applications may not be required at the end user device and additional permissions may not need to be granted. This system may therefore be deployed widely to the customers of the MNO.

One drawback of the Telecom Application Server service is that is does not provide users with a mechanism for reporting unsolicited calls.

FIG. 2 illustrates a Call anti-spam system using network integration of a Telecom Application Server 200 with a third-party Reputation Application Server 100. The Telecom Application Server (TAS) is controlled and operated by one of a number of operating companies 210. A call is received from an originating network 212 at an Interconnection Border Control Function (ICBF) 214 of the operating company's network. The call is passed to the IMS core component 216. The Telecom Application Server 200 processes the call and a Call Protect network SDK component 222 of the TAS queries the RAS 100. If the call is identified as suspected spam, the caller ID is updated to indicate that the call is suspected spam. The call is then passed to the Session Border Controller (SBC) 224 and notified to the UE 130. The UE display indicates that the call is suspected spam.

The Reputation Application Server 100 may obtain reports from external third-party sources 104. However, this may require additional licensing and user permission that may limit the scope of the service.

Alternatively, Mobile Network Operators can provide a call anti-spam system using a Telecom Application Server linked to an internal database of spam reports sourced directly from users. Call spam reports may be collected via SMS, rather than from external providers. However, many users are reluctant to use SMS and prefer to use more feature-rich messaging communication channels. For example, users may prefer a feature-rich communication service such as WhatsApp®. SMS may only offer basic user experience, which may be a reason for a decline in use of SMS among users. Another reason may be that integration between SMS and other applications is limited. Moreover, the SMS channel may be subject to spam messages. All these factors may result in users being reluctant to use SMS and therefore collecting spam reports via SMS may limit the data provided by users.

Another alternative system to address spam calls is STIR/SHAKEN®. STIR/SHAKEN (Secure Telephony Identity Revisited/Signature-based Handling of Asserted information using toKENs) is a suite of protocols and procedures for verification of call origin between telecom operators to verify that interim transit partners have not tampered with caller presentation. This system may allow tracking of call originator. However, for this system to be enforceable it requires widespread adoption and development of international regulation, which may take many years to build.

SUMMARY

In view of the problems present in the prior art, it is a goal of network operators to identify unsolicited calls and take action against them. In doing so, network operators hope to improve the service the user receives by (e.g. by filtering out unsolicited calls or warning users that an incoming call is a suspected unsolicited call). Doing so may also reduce the load on the network by identifying unsolicited calls before the signalling to establish the call has been completed. Additionally, the users of the telecommunications network may experience a more secure service if suspected scam calls are blocked or flagged to the user before they answer the call.

According to a first aspect, there is provided a method of reporting, to a network operator of a telecommunications network, an unsolicited call initiated to a user equipment, UE, of the telecommunications network. The network operator may be a mobile network operator (MNO). The method comprises receiving a message at a user equipment, UE, of the telecommunications network. In some examples, the method may include sending the message from a network entity, such as a server function, comprised in the telecommunications network. The message comprises a unique identifier corresponding to the unsolicited call. The message further comprises one or more predefined responses. The method further comprises receiving at the UE a selected response of the one or more predefined responses, indicating whether the call is an unsolicited call. The method further comprises sending a report to the network operator, the report comprising the unique identifier and the selected response. In some examples, a user of the UE may select one or more of the predefined responses at the UE; or an automated function at the UE, or communicatively connected to the UE, may select the one or more predefined responses. The message may be a feature rich message. As well as including predefined responses and a unique identifier (which may be automatically added to the response), the feature rich message may also contain images, logos and other content. Such feature rich messages may be more user friendly than text-only messages.

The step of receiving at the UE a selected response of the one or more predefined responses, indicating whether the call is an unsolicited call may be performed by presenting the one or more predefined responses in a user interface and receiving an indication from the user interface that one of the predefined responses has been selected (for example by a user pressing the selected response).

By providing methods that detect unsolicited calls, including so-called "spam" calls, network operators are able to provide improved service for their subscribers, whilst also reducing the network load resulting from such calls. The disclosed methods, user equipment, network entities and telecommunications networks may allow improved data collection in respect of unsolicited calls, which may allow algorithms that are configured to detect unsolicited calls to be more effective. These algorithms may also be less prone to "false positives", where genuine calls are mistakenly indicated as unsolicited calls. Such algorithms may deploy Machine Learning techniques and depend on quality and quantity of available data (for example, in the form of 'spam reports'), which may originate from end users who receive unsolicited calls at user equipment.

A prior art basic reporting service may be high maintenance and too slow to respond to fast changing spam patterns. In contrast, disclosed methods include sending a report that comprises a selected response of a set of predefined responses, as well as a unique identifier corresponding to an unsolicited call. The method may allow the network operator automatically and dynamically to update a database of initiators of unsolicited calls, using the selected response and the unique identifier comprised in the report, potentially allowing the MNO to respond more quickly to changes in traffic of unsolicited calls in the telecommunication network.

Allowing a user of the UE to select a response from the one or more predefined responses may provide a simple and effective method for the user to send the report to the network operator, which may increase the likelihood of the unsolicited call being reported. Predefined responses allow users to report unsolicited calls (such as spam or scam calls) without having to type. The user may report the call by simply tapping the relevant predefined response from a message (such as a pop-up notification). In contrast, a prior art reporting service may require a user to initiate a new SMS, enter details of the unsolicited call and send the report to a specific number designated for such reports, which they may need to look up independently. Disclosed example methods may increase the quantity of data collected by the network operator.

Mobile Network Operators wishing to integrate with a prior art native dialler component may need to negotiate a license agreement and share user data, based on consent from end users. Some users may decline to consent, which can limit the availability of data collected. In contrast, the example disclosed methods may be independently controlled by the network operator to control the collection of data associated with unsolicited calls, without needing to partner with third parties to get access to report data. The network operator may build a Reputation Application Server without sharing users' data with third parties. Additionally, since the reports of unsolicited calls may stay with the network operator, the network operator may not need to ask end users for their consent to share their data with third parties. This may result in an increase in data collected from users. Moreover, by increasing the amount of report data collected from users, the network operator may provide an improved service for detecting unsolicited calls.

A prior art caller reputation application may operate by providing user interface elements that are visible on top of other applications. For Example, the caller reputation application may operate by drawing an overlay on top of the dialler. This may require additional permissions to be granted by user. Moreover, certain prior art systems may require a network operator to access a third-party reputation database and may therefore require a network operator to enter an agreement with the third party and sharing of user data. This approach may also not be feasible with certain operating systems that do not allow applications to present user interface elements on top of other applications. For example, the operating system in use on Apple® devices does not offer functionality for applications to overlay the dialler. Example disclosed methods may include using a standard or known messaging service to report an unsolicited call to a network operator. There may be no need to request additional permissions and no need for a custom application in the device. As a result, user participation may be improved, and this may result in an increase in the quantity of report data.

One challenge with custom diallers described in the prior art is that users may be reluctant to replace their phone dialler. Some example disclosed methods may use a messaging service known in the prior art. There may be no need to request additional permissions from a user, or for the user to install a custom dialler. As a result, user participation may be improved, and this may result is better report data.

As described above, a message comprising one or more predefined responses is sent to the UE. This is different to custom diallers, which usually only provide voice control functionality, rather than messaging functionality.

A potential disadvantage of prior art approaches that involve integrating a Telecom Application Server with an internal or external Reputation Application Server is that no mechanism other than SMS may be provided for obtaining reports from end users. Example disclosed methods may provide a method that allows users to report unsolicited calls to the network operator. There may therefore be no need for the network operator to partner with external (third-party) providers. This may be achieved by allowing the user to select one of the set of predefined responses. Moreover, the report directly associates the response with the unsolicited call by providing a unique identifier within the report.

In certain prior art approaches, verification of call origin may require widespread adoption and mature international regulation, which may take many years to build. In the meantime, there may be many ways in which protections offered by such systems can be bypassed by fraudsters. In contrast, messaging services used in example disclosed methods may already be widely available. The disclosed method may therefore be implemented immediately.

A unique identifier that corresponds with a call placed to the UE is included in the message that is sent to the UE. This unique identifier is also included in the report that the UE provides to the MNO. In this way, the MNO can ensure that reports of unsolicited calls that are received relate to verifiable calls. This can improve the security of the system because reports that do not relate to verifiable calls placed to UEs can be easily identified. This can make it more difficult for spammers to undermine genuine report data received by the MNO by sending large quantities of spam reports to dilute genuine spam reports provided by the UE.

The unique identifier may comprise originating and destination numbers, a timestamp when the call was received and/or a unique conversation ID that associates the call with a chat thread initiated by the network operator. SMS messages may not include conversation IDs.

Moreover, the unique identifier may further enable the network operator to identify the specific call that has been reported, and to associate the report with more details regarding that call. This may improve the quality of the data collected from users by providing more information about each call that is reported. As a result, algorithms that may be used to detect unsolicited calls based on the data may be able to spot patterns more easily. This can lead to improved detection of unsolicited calls.

The message may be received by the UE before call signalling to establish the call is received by the UE.

If the message is received after the call has already been established, the message may not be seen by the user. Advantageously, the disclosed method may inform a user that a call is a suspected unsolicited call, before their UE (for example, a mobile phone) starts to alert a user to the incoming call. This can allow the user to reject the call if they believe that the call is unsolicited and therefore reduce the load on the network. Alternatively, if the user decides to take the call, they can do so in the knowledge that the call has been indicated as a suspected unsolicited call. They can therefore be wary of providing sensitive information to the caller. This can therefore improve security for the user.

The selected response may be an instruction to the network operator to reject the call without sending signalling to the UE to establish the call.

Advantageously, the proposed solution may provide users with an option to inform the network operator that they do not wish to take the call before the network operator has even begun the signalling to establish the call. In this way, the load on the network may be reduced by eliminating the need for signalling to establish calls that the user has no interest in receiving.

The message may be sent to the UE in response to a determination that the call to the UE has been answered at the UE.

In some examples, the disclosed method may detect that a voice call has been established with a suspected unsolicited call. In response, a message may be sent to the UE to request feedback on that call. By prompting a user of the UE to provide feedback on the call, the disclosed method may improve the quantity of report data received. With improved data, detection algorithms may more reliably identify whether calls are suspected unsolicited calls.

The message sent to the UE may be a feature-rich message. The message may include images as well as suggested responses (predefined responses).

The method may include determining whether a suspected unsolicited call to the UE has been placed, and sending the message only in cases where a suspected unsolicited call has been placed to the user (rather than for every call). This may reduce the quantity of messages sent to the user and improve efficiency of the reporting service.

In some examples, the disclosed method may include associating an identity of a caller with the unique identity of the call. The selected response may be an instruction to the network operator to reject further calls from a caller identity associated with the call.

In some examples of the disclosed method, the user may ask the network operator to block all future calls from an unsolicited caller. Advantageously, this may reduce the load on the network.

The call may be a voice over internet protocol, VoIP, call. For example, the call may be a voice over long term evolution, VOLTE, call.

VoIP calls (in particular, VOLTE calls) have data associated with each call that is not available for some other types of call (such as legacy PSTN calls). Some examples of the disclosed method may include associating reports of unsolicited calls with more data associated with the call (using the unique identifier). This data is available to the network operator because of their position in the network. The disclosed method may therefore be advantageous over prior art methods that do not have access to call data specific to VoIP calls, to which the network operator has access. The call data can be associated with the report and improve the quality of the data collected (for example in a call reputation database).The data associated with each call can be used by detection algorithms to provide an improved way of detecting unsolicited calls.

In some examples of the disclosed method, the message may be a rich communication services, RCS, message.

A Rich Communication Service chat-bot may be fully automated and may provide continuous a feed of new user reports for Machine Learning call anti-spam classifiers. The disclosed method may therefore be able to react to changes in unsolicited calls placed in a network.

RCS is a standard service that is already available for all Android® devices and accepted by nearly all Android users, where operators offer it. The disclosed method may therefore be implemented without requesting additional permissions from a large base of users that already have RCS.

Prior art verification of call origin may require widespread adoption and mature international regulation, which would likely take many years to build. In the meantime, there may be many ways in which protections offered by such systems can be bypassed by fraudsters. In contrast, Rich Communication Service chat-bot is already standardised and widely deployed, without a need for new procedures or regulation.

Another potential advantage of some examples of the disclosed methods and telecommunication networks may be that users are provided with a means of reporting unsolicited calls by accessing the Rich Communication Service channel. The reports may be used to provide an indication of the trustworthiness of a Caller ID. The proposed system therefore allows the network operator to contribute to a Caller ID verification ecosystem. In such an ecosystem, various companies may contribute to the end service in exchange for a share in overall revenue.

A network operator may exchange data collected via the disclosed method for data collected by third parties via alternative (sometimes proprietary) reporting services. Means by which reports of unsolicited calls may be provided to network operators or third parties may also be known as "reporting channels". Moreover, the network operator may exchange access to their reporting channels for access to proprietary reporting channels maintained by third parties; for example, with Google® or Samsung®, which may collect spam reports through their proprietary diallers.

RCS may provide a secure and trusted channel that is difficult to spoof. Users may therefore be confident that the message received over RCS is not a spam or a scam message. Moreover, the network operator can be confident that the report received from the UE is genuine.

The one or more predefined responses may comprise one or more of:
  an instruction to the network operator to reject the call;
  an instruction to the network operator to set up the call (proceed with the signalling required to establish the call);
  an instruction to the network operator to block all further calls from a caller identity associated with the call;
  an instruction to the network operator to set up all further calls from a caller identity associated with the call;
  an instruction to the network operator to set up further calls from a caller identity associated with the call during a first time period and block further calls from this caller during a second time period different to the first time period; and
  an indication of a category of the unsolicited call, wherein the category of the unsolicited call may be selected from a marketing call, a scam call, a nuisance call, a call for the purpose of data collection, and a service announcement call.

By providing the user with a set of predefined responses, the user may be able to provide a report more efficiently.

The user may elect to reject the call if they are informed that it is a suspected unsolicited call. This may reduce load on the network.

The user may instruct to the network operator to set up the call (that is, to proceed with signalling) if they think that the call has been incorrectly flagged as a suspected unsolicited call.

If the user takes the call and determines that the call was unwanted, they may send an instruction to the network operator to block all further calls from that caller. This instruction would also confirm that the call was correctly identified as unsolicited and this data could be used to improve the detection algorithms.

If the user takes the call and determines that the call was actually a genuine call (not unsolicited), they may send an instruction to the network operator to set up all further calls from that caller. This instruction would also indicate that the call was incorrectly flagged as unsolicited and this data could be used to improve the detection algorithms.

In some cases, the call may indeed be an unsolicited call but may be of interest to the user. In this case, the user may wish to receive calls from the caller, whilst also reporting that the call was unsolicited.

In some examples of the disclosed method, the one or more predefined option(s) may include an instruction to set up unsolicited calls, dependent upon one or more condition; for example, depending on the time of day. In the case of an unsolicited call that is of interest, the user may wish to sometimes receive calls from this caller and sometimes reject call from the caller. Where the user wishes to maintain this option, they may send an instruction to the network operator to set up further calls from a caller identity associated with the call during a first time period and block further calls from this caller during a second time period different to the first time period. This may be useful if the call relates to the user's profession; for example, they can elect to only take these calls during work hours. Alternatively, the call may be unrelated to work, and the user may wish to receive calls from this caller outside of working hours only. The user may also wish to block such unsolicited calls at night or other times when they do not wish to be disturbed.

In some examples of the disclosed method, a predefined option may comprise an indication to stop receiving calls from a caller for a specified time period, after which they may wish to start receiving calls again. The user may request to block calls from the caller for a week, for example.

In some examples of the disclosed method, a predefined option may comprise one or more category of an unsolicited call, which a user may select, to provide further data to the network operator. The category of the unsolicited call may be selected from one or more of: a marketing call, a scam call, a nuisance call, a call for the purpose of data collection, and a service announcement call. Alternatively, the categories may be more specific, such as calls relating to telecommunications services, calls relating to energy supplier services, calls related to taxi services etc. By collecting data in this way, the disclosed method may be able to provide information of the suspected nature of the unsolicited call to users when the unsolicited call is reported. This may enable a user to better decide how to proceed. A user may be more likely to reject a call if they are provided with sufficient information to enable them to be confident that the call is indeed unsolicited. This may therefore reduce the network load by allowing users to reject unsolicited calls more frequently.

According to a second aspect, there is provided a method of reporting an unsolicited call to a network operator of a telecommunications network, comprising sending a message to a user equipment, UE, of the telecommunications network. The message comprises a unique identifier corresponding to a call to the UE that has been initiated. The message further comprises one or more predefined responses. The method further comprises receiving a report from the UE, the report comprising the unique identifier and a response of the one or more predefined responses indicating that the call is an unsolicited call.

The method according to the second aspect may be performed by a network element or function that is managed and controlled by the network operator. The method according to the first aspect may be performed by the UE of the telecommunications network. The network element may be a server. The server may have access to more network data than the UE and may also have the ability to control network signalling. This can improve the efficiency of the telecommunication network because the server can terminate an unsolicited call before the signalling is performed. This may also be more secure because the server does not need to interface with a third-party reputation server. This can improve the quality of the data because the server is able to associate the report directly with a call and determine information relating to that call, which would not be available to the UE or to a third party operating a reporting service for unsolicited calls that is implemented and maintained externally (in other words, not managed and controlled by the network operator and also called an "over-the-top" service).

The selected response may be an instruction to the network operator to reject the call without sending signalling to the UE to establish the call. The method may further comprise rejecting the call without sending any signalling to the UE to establish the call.

Advantageously, if the user rejects the call before the signalling has been established, there is no need for the network operator to carry out the signalling. This may therefore result in improved efficiency of the network because resources are not wasted establishing calls that are unwanted.

The method may further comprise determining that the call is a suspected unsolicited call. The message may be sent to the UE in response to determining that the call is a suspected unsolicited call.

The disclosed methods may determine that a call being placed is an unsolicited call and send a message to the user in advance. The user can then decide how to proceed. If they do not wish to receive the call, then they can reject the call before signalling is established and therefore conserve network resources. If they are unsure whether the call is genuine, they can choose to take the call but proceed with caution. They may then send feedback after the call is complete. If they do not respond to the message, the disclosed method may include establishing the call to provide the user with another opportunity to accept or reject the call when their phone rings. In this case, they may replace or prepend the caller details with a warning that the call is a suspected unsolicited call. They can also send a report to inform the network operator that the call was an unsolicited call.

Determining that the call is a suspected unsolicited call may be based on one or more of:
  a caller identity associated with the call;
  call data relating to the caller identity and comprising a frequency of calls originating from the caller identity; and
  location data associated with the call and/or the caller identity.

The server may determine that a call is a suspected spam call based on data available at the server, such as caller ID information, call logs associated with that ID and caller location information. This information may not be available at other points in the network. The disclosed method may therefore be more reliable than prior art systems because it is able to determine whether a call is unsolicited based on more information about the call. In a specific example, if a particular number makes calls with a frequently exceeding a threshold frequency (such as 10 calls per hour), or at regular intervals (such as once every 5 minutes), it is likely to be a number in use by an automated dialling system and is therefore likely to be an unsolicited call.

Some examples of the disclosed methods may include the server, or other network element or function, accessing call logs of the network operator. They may therefore be able to determine how many times the user, who may be a subscriber of the network operator, has made an outgoing call in the last hour, or other period of time. Large numbers of outgoing calls or calls following time and/or number patterns (such as originating and destination number patterns) might indicate that the user is making unsolicited calls.

The method may further comprise determining that the call has been answered at the UE. The message may be sent to the UE in response to determining that the call has been answered at the UE.

Advantageously, the disclosed methods may provide a convenient mechanism for reporting unsolicited calls that includes an identifier relating to the specific call. This therefore improves the quality and quantity of the data collected, which can be used to improve spam filtering algorithms.

According to a third aspect, there is provided a user equipment, UE, configured to perform a method as described above. For example, the UE may be configured to perform steps of:
  receiving a message;
  receiving a selected response of the one or more predefined responses indicating that the call is an unsolicited call; and/or
  sending a report to the network operator.

According to a fourth aspect, there is provided a network entity configured to perform a method as described above. For example, the network entity may be configured to perform steps of:
  sending a message to a user equipment, UE, of the telecommunications network;
  receiving a report from the UE, the report comprising the unique identifier and a response of the one or more predefined responses indicating that the call is an unsolicited call;
  rejecting the call without sending any signalling to the UE to establish the call;
  determining that the call is a suspected unsolicited call; and/or
  determining that the call has been answered at the UE.

According to a fifth aspect, there is provided a telecommunications network, configured to perform an example disclosed method.

BRIEF DESCRIPTION OF THE DRAWINGS

Examples of disclosed methods and arrangements of UEs and network entities will be described in more detail, with reference to the following drawings, of which:

FIG. 1 illustrates a prior art call anti-spam system using a downloadable caller reputation application with a third-party Reputation Application Server.

FIG. 2 illustrates a prior art call anti-spam system using network integration of a Telecom Application Server with a third-party Reputation Application Server.

FIG. 3 illustrates a method of reporting an unsolicited call to a network operator of a telecommunications network, in accordance with a specific example.

DETAILED DESCRIPTION OF SPECIFIC EXAMPLES

Figure 4:
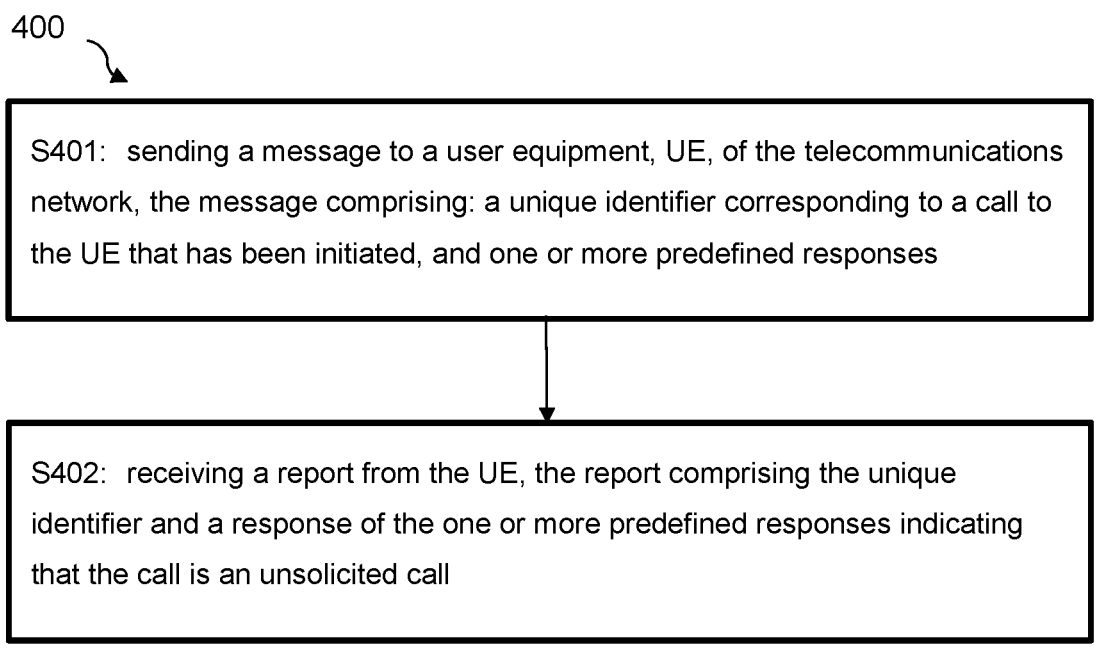
FIG. 4 illustrates a method of reporting an unsolicited call to a network operator of a telecommunications network, in accordance with a specific example.

A call anti-spam system may comprise the following elements:
  1. Access to information which can be used to determine if the call, often originating from wholesale partner or another Mobile Network Operator is likely spam. This information may originate from two sources:
     a) users who report spam; and
     b) traffic monitors that watch network traffic profiles for each originating and destination numbers and detect call patterns typical for spam.
  2. Access to notification channels to notify users of the call reputation.
  3. Optionally, control over the call setup and delivery process to for example block the call, or delay call setup giving users time to see the spam indication.

Ideally, these elements should be integrated into a seamless user experience.

One challenge preventing a single provider from delivering an end-to-end call anti-spam system is that the voice call ecosystem is fragmented. Different participants of the ecosystem provide different parts that relevant for call anti-spam. Particularly relevant components include:
  1. A dialler application that provides user interface is controlled by the Operating System providers (such as Google® or Apple®) or Original Equipment Manufacturers (such as Samsung® or Huawei®. The dialler is also a natural place to collect user spam reports from end users.
  2. A voice call delivery network that is controlled by Mobile Network Operators, which interconnect with each other to serve call originating and terminating parties. Call backend allows modifying caller ID, call blocking and in-call voice announcements.
  3. A Push Notification channel that is controlled by Operating System Manufacturers.
  4. Telecommunications messaging systems that are controlled by either Mobile Network Operators (in case of SMS) or Mobile Network Operators together with 3rd party Service Providers (in case of Rich Communication Service).

This fragmented situation induces any provider of call anti-spam service to partner with other participants of the ecosystem.

The proposed solution addresses the challenge presented above in a way that is beneficial for users because they already have a contract with the MNO for voice service and RCS. There is no need to involve third parties and grant access to customer private data. Moreover, the proposed solution is particularly useful for Mobile Network Operators. Mobile Network Operators are in control of two of the required elements:
- A) Control over voice call delivery—Mobile Network Operators own the voice call service backend; and
- B) Access to a notification channel to notify users of the call reputation—Mobile Network Operators can replace caller ID in the incoming calls with spam notification text, which will be rendered by existing user interfaces (diallers).

Some Mobile Network Operators have developed systems to provide a spam report channel (such as accepting reports sent via SMS). However, there are problems with these channels, as discussed above.

As mentioned above, Mobile Network Operators can deliver call an anti-spam system using a VoLTE Telecom Application Server integrated with a Reputation Application Server. The Reputation Application Server may be populated with spam reports collected from users via SMS. However, as discussed above, the SMS communication channel is facing two challenges that reduce the suitability of this channel for collecting call spam reports:
1. SMS only offers a simple text interface. This can make its use for automated systems cumbersome for users. Users may prefer more feature rich communication channels, such as Rich Communications Service or WhatsApp®.
2. SMS was not designed with end-to-end security in mind. This can result in the ability for third parties to inject SMSes into Mobile Network Operators' networks though wholesale interfaces. This can create so called "grey routes" where SMS origin cannot be verified. As a result, the SMS channel may became source of spam itself. It is a problem when integrating SMS with Application to Person solutions like spam reports because the overall solution relies on consistency of information exchanged between users and network operators. Use of unreliable and spammed SMS channel for anti-spam reporting may compromise the reliability of data collected in this way. In contrast, RCS offers a conversation ID, which provides assurance that the report is exchanged between specific user and the network anti-spam service. Moreover, RCS may also facilitate associating the report to specific call between originating and destination numbers, using the conversation ID.

Despite its limitations, SMS has an advantage of being a well-established and widespread service because it is mandatory mobile service. Each network has a gateway that receives SMS messages and terminates them to the network users though the network operator's own infrastructure.

The proposed solution takes advantage of the fact that a Mobile Network Operator also controls a Rich Communication Service channel. This channel is not currently used for spam reporting. However, the proposed solution uses this communications channel for spam report collection. Although Rich Communication Service channel is in many cases delivered with help of partners, for example using Google Jibe Hub® backend, or Google Android Messages® client, the service itself is standardized by Global System for Mobile Communications (GSMA) and operators can enforce its use for the purpose of call spam reports.

Rich Communication Service (RCS) does not suffer the "grey routes" problem in the way that SMS does. Moreover, RCS offers a feature rich channel that is often implemented separately from the call infrastructure, typically with help of third-party service providers. Early Rich Communication Service delivery models were similar to SMS: each network would deploy its own service and interconnect with all other networks. However, due to delivery and interconnect complexity, only a limited subset of operators followed this model. Other operators opted for one of the following scenarios:
1. Shared deployment in the central hub own by group of Mobile Network Operators.
2. Shared deployment in the central hub own by a third party.
3. Managed service provided by a public Rich Communication Service hub (such as Google Jibe Hub®).
4. Allowing an Over The Top Rich Communication Service provider to run the service by themselves. This model is default for all Android Messages® devices where the Mobile Network Operator did not opt for another option.

As a result using a Rich Communication Service system to collect spam reports requires integration between local operators private call backend and operator's central or public Rich Communication Service hub. Both these systems exist in different operational domains, use different protocols and are not designed to interoperate.

In a specific example, the disclosed method proposes creating a Rich Communications Service (RCS) Business Messaging chat-bot service integrated with the VoLTE Telecom Application Server to collect spam reports from users. When user receives a phone call, they would receive a rich chat message from a Call Protect Rich Communication Service chat-bot asking if the call is spam. Unlike with SMS, Rich Communication Service messages cannot be spoofed (or at least are much more difficult to spoof effectively). Users can therefore trust the RCS channel above the SMS channel. Also, the RCS message can offer useful features like suggested responses, images and links. A Rich Communication Service chat-bot can therefore offer a consistent user experience. The disclosed methods may therefore provide improvements over prior art communication channels.

Spam reports from users may be used to improve spam-detection Machine Learning based detection mechanisms.

A small improvement in efficiency in the mechanism allowing a user to report spam may result in a much larger improvement in the quantity of report data gathered from a user base. This may be at least partly because an inefficient reporting mechanism for unsolicited calls that is not very user friendly may discourage users from providing report data. In contrast, by using a feature rich messaging platform, such as a Rich Communication Service Business Messaging chat-bot, a consistent, secure and efficient method for submitting report data may be provided. As a result, the quantity and quality of the data report data collected may be improved.

A feature rich chat-bot platform may be developed to provide additional functionality. For example, applications may be designed to inter-operate with the platform to provide additional features for users, such as for providing access to weather, news, online games, payments and the like. Rich Communication Service is able to offer such features to users via Rich Communication Service Business Messaging, which is able to provide application-to-person applications. In particular, Rich Communication Service Business Messaging chat-bots have advantages over SMS chat-bots. SMS messaging was originally designed for person-to-person communication. Its use for application-to-person solutions is limited due to being restricted to text-only communication and lack of end-to-end security (grey routes). In contrast, Rich Communication Service Business Messaging chat-bots have additional features that may be used to provide improved spam reporting compared to SMS chat-bots, as described below. For example, Rich Communication Service Business Messaging chat-bots offer visual branding that can be made consistent with other channels of the Mobile Number Operator. Moreover, Rich Communication Service Business Messaging chat-bots offer an intelligent communication channel allowing other features which we can be added, like:

allowing reporting spam long time after the call;
reporting spam from private numbers;
listing calls, alongside the network operator that owned the calling number;
more detailed control of call anti-spam and anti-scam behaviour for specific cases (such as blocking and delaying calls);
control over call blocking and forwarding;
control over other supplementary services, like call presentation; and
integration with Rich Communication Service Chat-bot Information Service, which is an online catalogue of chat-bots which can be used as information channels about calling numbers and brands.

FIG. 3 illustrates a method of reporting an unsolicited call to a network operator of a telecommunications network, in accordance with a specific example. The method comprises the following steps:

S301: receiving a message at a user equipment, UE, of the telecommunications network, the message comprising: a unique identifier corresponding to a call to the UE that has been initiated, and one or more predefined responses;
S302: receiving at the UE a selected a response of the one or more predefined responses indicating that the call is an unsolicited call; and
S303: sending a report to the network operator, the report comprising the unique identifier and the selected response.

FIG. 4 illustrates a method of reporting an unsolicited call to a network operator of a telecommunications network, in accordance with a specific example. The method comprises the following steps:

S401: sending a message to a user equipment, UE, of the telecommunications network, the message comprising: a unique identifier corresponding to a call to the UE that has been initiated, and one or more predefined responses;
S402: receiving a report from the UE, the report comprising the unique identifier and a response of the one or more predefined responses indicating that the call is an unsolicited call.

Figure 5:
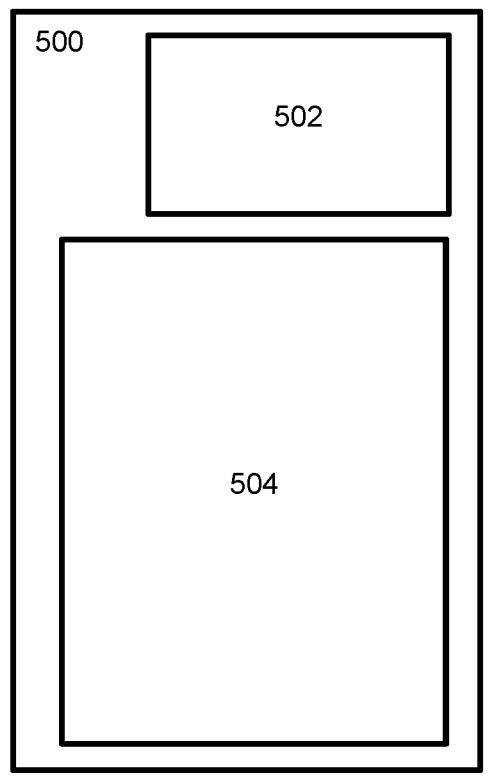
FIG. 5 Illustrates a schematic example arrangement of a UE, according to a specific example.

FIG. 5 Illustrates a UE 500. The UE comprises a transceiver 502 configured to send and receive messages. The UE further comprises a user interface configured to display a message to the user. The message comprises one or more predefined responses that are also displayed via the user interface. The user interface is further configured to detect a selection of one of the predefined responses from the user. In response to selection of a predefined response, the UE is configured to send a report to the network operator, the report comprising the selected response.

Figure 6:
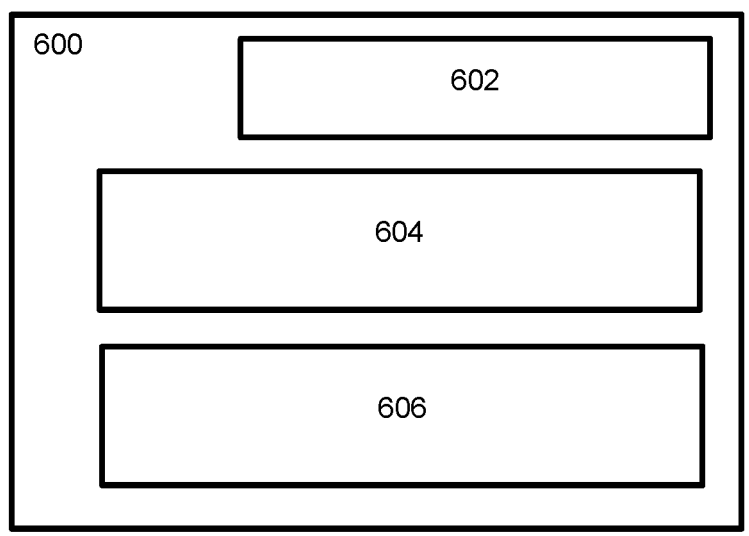
FIG. 6 illustrates a schematic example arrangement of a network entity, according to a specific example.

FIG. 6 illustrates a network entity (such as a server) 600. The network entity comprises a message gateway 602. The network entity is configured to send a message (via the message gateway 602) to a user equipment, UE, of the telecommunications network. The message comprises: a unique identifier corresponding to a call to the UE that has been initiated, and one or more predefined responses. The network entity is further configured to receive (via the message gateway 602) a report from the UE, the report comprising the unique identifier and a response of the one or more predefined responses indicating that the call is an unsolicited call.

The network entity further comprises a signalling gateway 604. The network entity is configured to determine (via the signalling gateway 604) that a call has been initiated to the UE. The network entity further comprises an unsolicited call detector 606. The UE is configured to detect (using unsolicited call detector 606) that the call initiated to the UE is a suspected unsolicited call.

Whilst the network entity is described as a single entity (such as a server) the functions of the network entity may be distributed across different entities in the network.

In the methods described above, a report of an unsolicited call is sent to the network operator. The report may be sent directly to the network operator or may be sent to an intermediary and subsequently passed on to the network operator. The intermediary may process the data from the report into a more convenient form for the network operator. The intermediary may be a third-party service. The intermediary may populate a database with report data. The database may be accessible by the network operator.

In the case that a report is sent directly to the network operator, there may be no need for an additional agreement to share data relating to voice calls with a third party. The network operator may already have consent to access data relating to voice calls because they provide the voice call service.

Where the methods refer to a call being "answered", this is intended to include call scenarios where an audio connection is established between the UE and the remote caller. This may also include situations in which the call goes to voicemail and an audio connection is established between the remote caller and the application server responsible for voicemail. In this case, the user may listen to the voicemail and provide subsequently send a report that the call was an unsolicited call. The term "answered" is not intended to cover scenarios in which the user rejects the call and no audio connection is ever established between the remote caller and either the UE or the voicemail application server.

The invention claimed is:

1. A method of reporting an unsolicited call to a network operator of a telecommunications network, the method comprising:
receiving a message at a user equipment of the telecommunications network, the message comprising:
a unique identifier corresponding to a call that has been initiated to the UE, and
one or more predefined responses;
receiving, at the UE, a selected response that is selected from among the one or more predefined responses and that indicates the call is an unsolicited call, wherein the selected response includes an indication to temporarily stop receiving calls from a caller who made the call, the indication indicating that the calls from the caller are to temporarily be stopped for a specified time period that is specified in the selected response, and wherein, after the specified time period elapses, the UE is permitted to again receive calls from the caller; and
sending a report to the network operator, the report comprising the unique identifier and the selected response.

2. The method of claim 1, wherein the message is received by the UE before call signalling to establish the call is received by the UE.

3. The method of claim 2, wherein a later selected response, which is included in the one or more predefined responses, is an instruction to the network operator to reject a later call without sending signalling to the UE to establish the later call.

4. The method of claim 1, wherein the message is sent to the UE in response to a determination that the call to the UE has been answered at the UE.

5. The method of claim 4, wherein a later selected response, which is included in the one or more predefined responses, is an instruction to the network operator to reject further calls from a caller identity associated with the call.

6. The method of claim 1, wherein the call is a voice over internet protocol, VoIP, call.

7. The method of claim 1, wherein the message is a rich communication services, RCS, message.

8. The method of claim 1, wherein the one or more predefined responses comprises one or more of:
   an instruction to the network operator to reject the call;
   an instruction to the network operator to set up the call;
   an instruction to the network operator to block all further calls from a caller identity associated with the call;
   an instruction to the network operator to set up all further calls from a caller identity associated with the call;
   an instruction to the network operator to set up further calls from a caller identity associated with the call during a first time period and block further calls from this caller during a second time period different to the first time period; and
   an indication of a category of the unsolicited call, wherein the category of the unsolicited call may be selected from a marketing call, a scam call, a nuisance call, a call for the purpose of data collection, and a service announcement call.

9. A user equipment, UE, configured to perform the method of claim 1.

10. A method of reporting an unsolicited call to a network operator of a telecommunications network, the method comprising:
    sending a message to a user equipment of the telecommunications network, the message comprising:
       a unique identifier corresponding to a call that has been initiated to the UE, and
       one or more predefined responses;
    receiving a report from the UE, the report comprising the unique identifier and a response that is selected from among the one or more predefined responses and that indicates the call is an unsolicited call, wherein the selected response includes an indication to temporarily stop receiving calls from a caller who made the call, the indication indicating that the calls from the caller are to temporarily be stopped for a specified time period that is specified in the selected response, and wherein, after the specified time period elapses, the UE is permitted to again receive calls from the caller.

11. The method of claim 10, wherein a later selected response, which is included in the one or more predefined responses, is an instruction to the network operator to reject a laster call without sending signalling to the UE to establish the later call, and wherein the method further comprises:
    rejecting the later call without sending any signalling to the UE to establish the later call.

12. The method of claim 10, wherein the method further comprises:
    determining that the call is a suspected unsolicited call,
    wherein sending the message to the UE is performed in response to determining that the call is the suspected unsolicited call.

13. The method of claim 12, wherein determining that the call is the suspected unsolicited call is based on one or more of:
    a caller identity associated with the call;
    call data relating to the caller identity and comprising a frequency of calls originating from the caller identity; and
    location data associated with the call and/or the caller identity.

14. The method of claim 10, further comprising:
    determining that the call has been answered at the UE, and
    wherein sending the message to the UE is performed in response to determining that the call has been answered at the UE.

15. A network entity configured to perform the method of claim 10.

* * * * *